(12) United States Patent
Satoh (10) Patent No.: US 10,008,945 B2
(45) Date of Patent: Jun. 26, 2018

(54) SWITCHING POWER SUPPLY DEVICE

(71) Applicant: Panasonic Intellectual Property Management Co., Ltd., Osaka (JP)

(72) Inventor: Nobuaki Satoh, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/520,104

(22) PCT Filed: Nov. 20, 2015

(86) PCT No.: PCT/JP2015/005809
§ 371 (c)(1),
(2) Date: Apr. 19, 2017

(87) PCT Pub. No.: WO2016/088322
PCT Pub. Date: Jun. 9, 2016

(65) Prior Publication Data
US 2017/0317599 A1    Nov. 2, 2017

(30) Foreign Application Priority Data

Dec. 5, 2014    (JP) .................................. 2014-246732

(51) Int. Cl.
*H02M 3/335* (2006.01)
*H02M 1/08* (2006.01)
(Continued)

(52) U.S. Cl.
CPC ......... *H02M 3/33523* (2013.01); *H02M 1/08* (2013.01); *H02M 1/4241* (2013.01); *H02M 2001/0054* (2013.01)

(58) Field of Classification Search
CPC .. H02M 3/33523; H02M 1/08; H02M 1/4241; H02M 2001/0054
See application file for complete search history.

(56) References Cited

U.S. PATENT DOCUMENTS 6,504,739 B2 * 1/2003 Phadke .................. H02M 1/38
363/127
2002/0001210 A1    1/2002 Kuranuki et al.
(Continued)

FOREIGN PATENT DOCUMENTS

JP      2006-204048 A    8/2006
JP      2008-099348 A    4/2008
(Continued)

OTHER PUBLICATIONS

International Search Report of PCT application No. PCT/JP2015/005809 dated Feb. 9, 2016.
(Continued)

*Primary Examiner* — Jue Zhang
(74) *Attorney, Agent, or Firm* — Pearne & Gordon LLP (57) ABSTRACT

A switching power supply device includes a power factor improvement circuit, a phase-shifted full bridge type DC/DC converter that is arranged in a rear stage of the power factor improvement circuit and has a full-bridge type switching circuit, an output current detecting circuit for detecting an output current to be supplied to a load, an output voltage detecting circuit for detecting an output voltage to be supplied to the load, and a power factor improvement circuit output voltage detecting circuit for detecting a power factor improvement circuit output voltage, which is input from the power factor improvement circuit to the DC/DC converter. The switching power supply device further includes a control unit for dynamically changing dead times of the full-bridge type switching circuit based on the power factor improvement circuit output voltage, and the output current and the output voltage to be supplied to the load, and the control unit applies the dead times that have been changed to control switching of the full-bridge type switching circuit.

4 Claims, 7 Drawing Sheets

(51) Int. Cl.
  *H02M 1/42* (2007.01)
  *H02M 1/00* (2006.01)

(56) References Cited

U.S. PATENT DOCUMENTS

2002/0190665 A1    12/2002  Sun
2012/0120683 A1*   5/2012   Hua .................. H02M 3/33592
                                                    363/17
2012/0300502 A1*   11/2012  Shimada ............. H02M 1/4258
                                                    363/17

FOREIGN PATENT DOCUMENTS

JP     2013-132112 A    7/2013
JP     2013-188015 A    9/2013
WO     2000/035252 A2   6/2000

OTHER PUBLICATIONS

The Extended European Search Report dated Nov. 10, 2017 for the related European Patent Application No. 15865831.0.

* cited by examiner

SWITCHING POWER SUPPLY DEVICE

TECHNICAL FIELD

The present invention relates to a switching power supply device having a phase-shifted full bridge type DC/DC converter.

BACKGROUND ART

Figure 1:
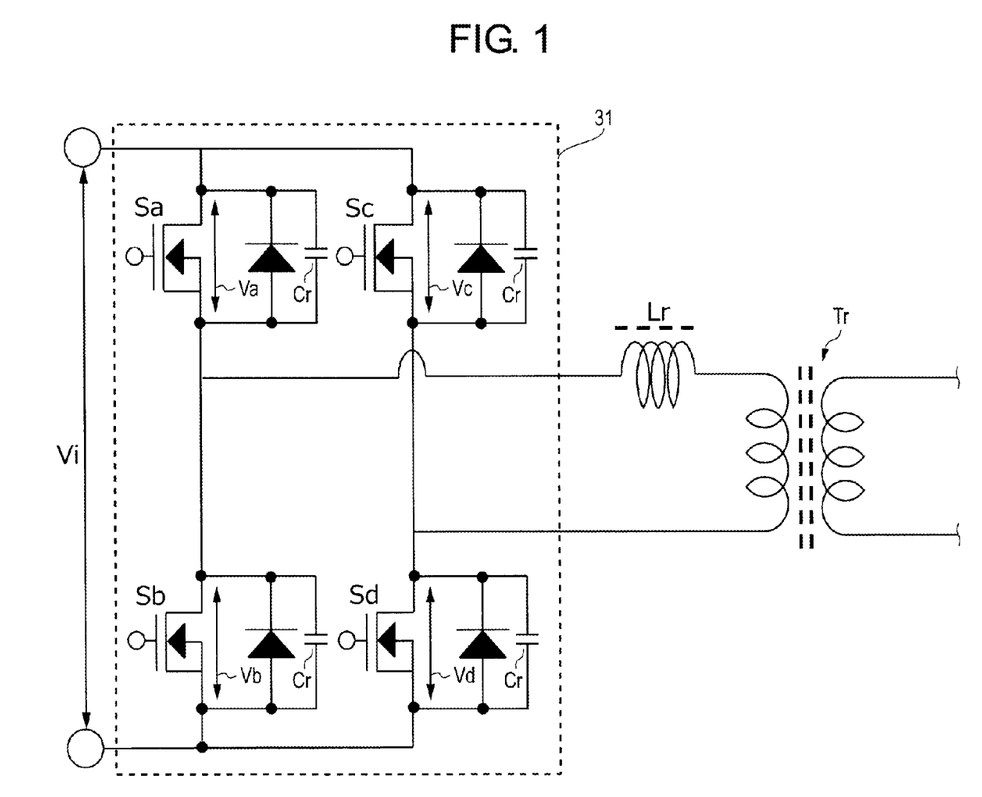
FIG. 1 is a circuit diagram showing basic parts of a phase-shifted full bridge type DC/DC converter.

In the related art, there are phase-shifted full bridge type DC/DC converters. As shown in FIG. 1, a phase-shifted full bridge type DC/DC converter includes full-bridge type switching circuit 31 having four switching elements Sa, Sb, Sc and Sd. As shown in (a) to (d) of the time chart of FIG. 2, the phase-shifted full bridge type DC/DC converter outputs power according to a load by switching four switching elements Sa, Sb, Sc, and Sd.

In a fell-bridge type switching circuit, in time period Ton1 during which a pair of switching elements Sa and Sd are both turned on, input voltage Vi is output to a primary winding of transformer Tr, and a current flows to transformer Tr through switching elements Sa and Sd. Further, in time period Ton2 during which a pair of switching elements Sb and Sc are both turned on, input voltage Vi is output to the primary winding of transformer Tr in a reverse direction, and a reverse current flows to transformer Tr through switching elements Sb and Sc.

Four switching elements Sa, Sb, Sc, and Sd are controlled at a predetermined duty ratio. The duty ratio is a value obtained by adding or subtracting dead times Td1 and Td2 by 50%. When the load changes, by changing a switching phase between one and the other of the pair of switching elements Sa and Sd, time period Ton1 during which the current flows through switching elements Sa and Sd is changed. Similarly, by changing the switching phase between one and the other of the other pair of switching elements Sb and Sc, time period Ton2 during which the current flows through switching elements Sb and Sc is changed. In this way, in response to changes in the load, time periods Ton1 and Ton2 during which a current flows increase or decrease, and output power changes.

Further, in the phase-shifted full bridge type DC/DC converter, by controlling Zero Voltage Switching (ZVS), switching loss is reduced in the related art.

In the control of ZVS, between two switching elements Sa and Sb of which the input terminals are connected to each other in series and which are not turned on at the same time, delay is set from turning off one to turning on the other. This delay is dead tune Td1. Similarly, between the other set of two switching elements Sc and Sd that are not turned on at the same time, dead time Td2 is set from turning on one to turning on the other (see (a) to (d) of FIG. 2).

Figure 2:
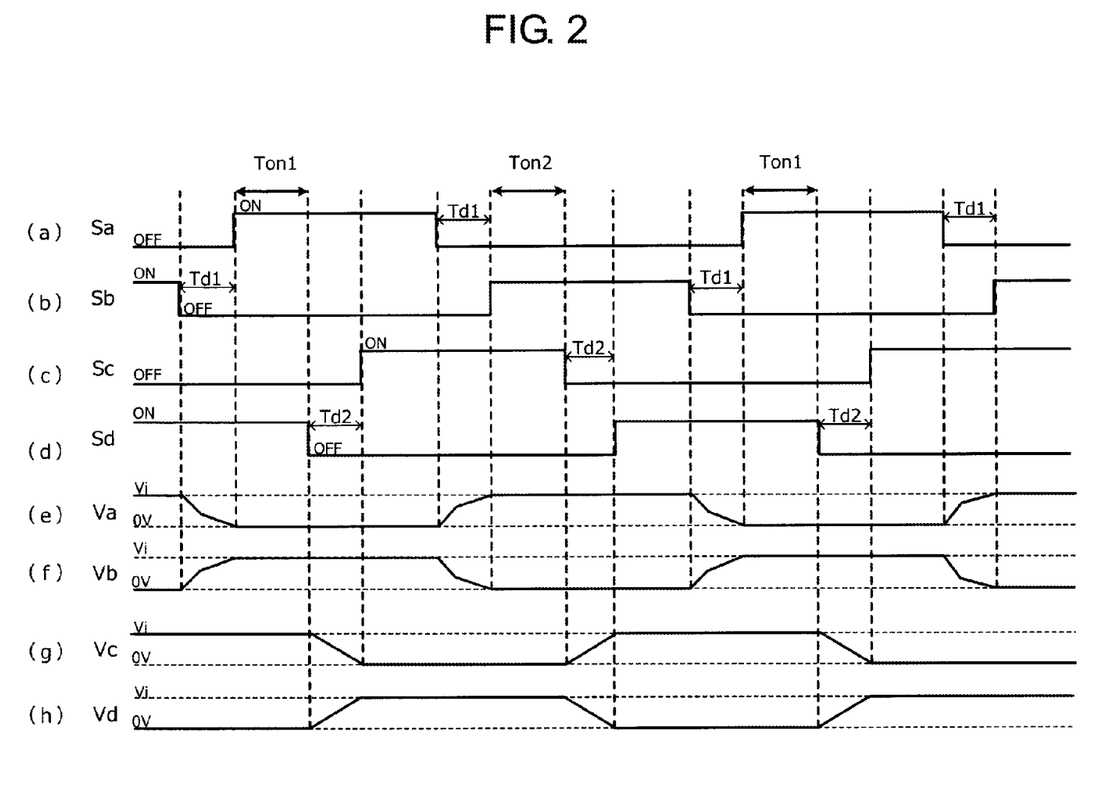
FIG. 2 is a time chart for explaining an operation of the phase-shifted full bridge type DC/DC converter.

By setting such dead times Td1 and Td2, switching elements Sa, Sb, Sc, and Sd are turned on after both-end voltages Va, Vb, Vc, and Vd become zero volt respectively (see (e) to (h) of FIG. 2). Both-end voltages Va, Vb, Vc, and Vd are a source-drain voltage when switching elements Sa, Sb, Sc, and Sd are FETs.

After each corresponding both-end voltage Va, Vb, Vc, or Vd becomes zero volt, switching elements Sa, Sb, Sc, and Sd are turned on. In this way, in a time period during which ON-resistance is a value between zero and infinity, it is possible to suppress the flow of a current passing through each switching element Sa, Sb, Sc, or Sd. Accordingly, the power consumed in each switching element Sa, Sb, Sc, or Sd (switching loss) is reduced. Dead times Td1 and Td2 are normally set to one fourth of a resonance period determined from inductance avid capacitance values included in a circuit to be opened and closed by switching elements Sa, Sb, Sc, and Sd. The inductance and the capacitance values for generating resonance are, for example, resonance inductor L and parasitic capacitance Cr of switching elements Sa, Sb, Sc, and Sd.

Conventionally, in a phase-shifted full bridge type DC/DC converter for controlling ZVS, a technology to further improve the power conversion efficiency has been proposed (for example, see PTL 1).

In PTL 1, a saturable choke coil is provided in the rear stage of the four switching elements connected in a full bridge type, and by changing inductance of a circuit according to an amount of a load, unnecessary power loss is reduced. Further, in Embodiment 2 of PTL 1, a standard dead time changes in accordance with the change in the inductance of the saturable choke coil. Therefore, the ZVS is controlled by dynamically setting dead times in accordance with a standard dead time that changes.

CITATION LIST

Patent Literature

PTL 1: Japanese Patent Unexamined Publication No. 2013-188015

SUMMARY OF THE INVENTION

In the phase-shifted full bridge type DC/DC converter, a resonance waveform generated in the full-bridge type switching circuit may change from a standard resonance waveform depending on the differences in the magnitude of the output or the magnitude of the input. Accordingly, in the phase-shifted full bridge type DC/DC converter, the power conversion efficiency may be reduced with the change in the resonance waveform based on the changes of the input and output.

Switching power supply device according to an aspect of the present invention is a switching power supply device that converts input power input from an AC power source to supply the power to a load. The switching power supply device according to the aspect of the present invention includes a power factor improvement circuit, a phase-shifted full bridge type DC/DC converter that is arranged in a rear stage of the power factor improvement circuit and has a full-bridge type switching circuit, an output current detecting circuit for detecting an output current to be supplied to a load, an output voltage detecting circuit for detecting an output voltage supplied to the load, a power factor improvement circuit output voltage detecting circuit for detecting a power factor improvement circuit output voltage, which is input to the DC/DC converter from the power factor improvement circuit, and a control unit for dynamically changing dead times of the full-bridge type switching circuit based on the power factor improvement circuit output voltage, and the output current and the output voltage to be supplied to the load. The control unit applies the dead times that have been changed to control switching of the full-bridge type switching circuit.

A switching power supply device according to another aspect of the present invention is a switching power supply device for converting an input power input from an AC power source to supply the power to a load. The switching power supply device according to the aspect of the present invention includes a power factor improvement circuit, a phase-shifted full bridge type DC/DC converter that as arranged in a rear stage of the power factor improvement circuit and has a full-bridge type switching circuit, an output current, detecting circuit for detecting an output current to be supplied to the load, an output voltage detecting circuit for detecting an output voltage to be supplied to the load, and a control unit for dynamically changing dead times of the full-bridge type switching circuit based on the detected output current and output voltage. The control unit applies the dead times that have been changed to control switching of the full-bridge type switching circuit.

A switching power supply device according to still another aspect of the present invention is a switching power supply device for converting an input power to supply the power to a load. The switching power supply device according to the aspect of the present invention includes a phase-shifted full bridge type DC/DC converter having a full-bridge type switching circuit, an output current detecting circuit for detecting an output, current to be supplied to a load, an output voltage detecting circuit, for detecting an output voltage to be supplied to the load, a control unit for dynamically changing dead times of the full-bridge type switching circuit based on the detected output current and output voltage, in which the control unit applies the dead times that have been changed to control switching of the full-bridge type switching circuit.

According to the present invention, the switching power supply device having a phase-shifted full bridge type DC/DC converter can be suppressed in size and realize a high power conversion efficiency.

DESCRIPTION OF EMBODIMENTS

Prior to the description of embodiments of the present invention, problems in the conventional devices will be briefly described.

In the technology of PTL 1, since an inductance value of a saturable choke coil changes according to the magnitude of an output, a standard resonance period also changes accordingly. Therefore, in the technology of PTL 1, dead times are set so as to match the change in the standard resonance period. In the technology of PTL 1, simply, the dead times are controlled to become longer according to an increase in the output current value (see paragraph [0061] of PTL 1). In such a control, it is difficult to cope with a case where the resonance waveform changes from the standard resonance waveform.

Furthermore, in the technology of PTL 1, newly adding a saturable choke coil cause a problem that the size of the power supply device is increased.

Hereinafter, embodiments of the present invention will be described in detail with reference to the drawings.

Figure 3:
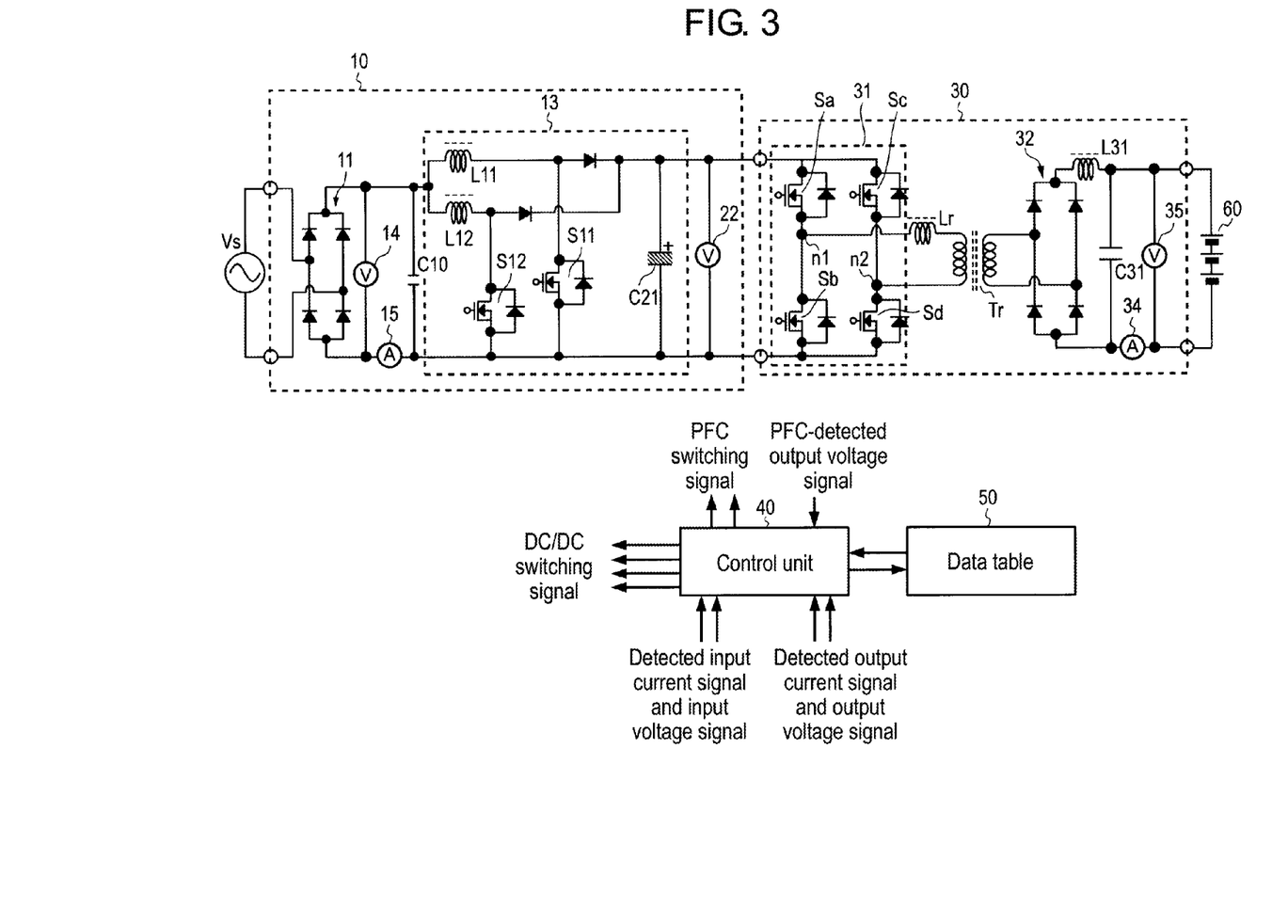
FIG. 3 is a configuration diagram of a switching power supply device of an embodiment of the present, invention.

FIG. 3 is a configuration diagram of a switching power supply device of an embodiment of the present invention.

A switching power supply device according to an embodiment, of the present invention includes AC/DC converter 10, DC/DC converter 30, control unit 40, and data table 50. It is not particularly limited, but in the example of FIG. 3, as load 60, a storage battery for out putting power of an electric vehicle is used.

AC/DC converter 10 converts the power of AC power source Vs and outputs a DC voltage so as to suppress backflow of harmonics to AC power source Vs. AC/DC converter 10 includes rectifying circuit 11 for rectifying AC power source Vs, smoothing capacitor C10 for smoothing a rectified voltage, an active type power factor improvement circuit (hereinafter, referred to as PFC circuit: Power Factor Correction (PFC)) 13 having choke coils L11 and L12, switching elements S11 and S12 and smoothing capacitor C21. Switching elements S11 and S12 are switched by the control of control unit 40.

AC/DC converter 10 further includes input, voltage detector 14 for detecting a voltage (rectified voltage) input to PFC circuit 13 and input current detector 15 for detecting a current, input to PFC circuit 13. The detected input voltage signal of input voltage detector 14 and the detected input current signal of input current detector 15 are sent, to control unit 40. Here, input voltage detector 14 and input current detector 15 may be arranged in the rear stage of smoothing capacitor C10.

AC/DC converter 10 further includes PFC output voltage detector 22 for detecting the output voltage of PFC circuit 13. The PFC-detected output, voltage signal of PFC output voltage detector 22 is sent to control unit 40.

DC/DC converter 30 is a circuit of a phase-shifted full bridge Pulse Width Modulation (PWM) power, which receives a voltage from AC/DC converter 10 and outputs a power corresponding to load 60. DC/DC converter 30 includes a foil-bridge type switching circuit 31 in which four switching elements Sa, Sb, Sc, and Sd are connected in a full-bridge type, resonance coil Lr, transformer Tr, rectifying circuit 32, choke coil L31, and output capacitor C31.

DC/DC converter 30 further includes output current detector 34 for detecting an output current, and output voltage detector 35 for detecting an output voltage. The detected output current signal of output current detector 34 and the detected output voltage signal of output voltage detector 35 are sent to control unit 40.

Each switching element Sa, Sb, Sc, or Sd is, for example, a metal-oxide-semiconductor field-effect Transistor (MOSFET), which passes a current between both terminals (source terminal and drain terminal) by controlling a control terminal (gate terminal). When a resistance between the both terminals of each switching element Sa, Sb, Sc, or Sd is almost zero resistance (ON), and non-conductive (OFF), the power consumed in switching elements Sa, Sb. Sc, and Sd is almost zero. On the other hand, when switching elements Sa, Sb, Sc, and Sd are switched from on to off, or the switching elements are switched from off to on, ON-resistance between the both terminals results between zero and infinity. Therefore, when a current flows in this time period, power is consumed and switching loss occurs.

Each switching element Sa, Sb, Sc, or Sd has, for example, parasitic capacitance Cr (not shown) in one end of the parasitic diode.

Note that as long as switching elements Sa, Sb, Sc, and Sd are elements that can pass a large current, between two terminals by being turned on and off by the control of a control terminal, any element such as an Insulated Gate Bipolar Transistor (IGBT) may be applied.

In full-bridge type switching circuit 31, the primary winding of transformer Tr is connected between two output nodes n1 and n2. As in the time chart in (a) to (d) of FIG. 2, switching elements Sa, Sb, Sc, and Sd are switched by the control of control unit 40. In time period Ton1 during which switching elements Sa and Sd are turned on, a forward voltage is output between two output nodes n1 and n2. In addition, in time period Ton2 during which switching elements Sb and Sc are turned on, a reverse voltage is output between two output, nodes n1 and n2. In this way, full-bridge type switching circuit 31 outputs a current that periodically changes its direction in the forward direction and the reverse direction to transformer Tr.

Resonance coil Lr is connected to the primary winding of transformer Tr in series between two output nodes n1 and n2 of full-bridge type switching circuit 31. When, a current is output between output nodes n1 and n2 by switching control, any one of switching elements Sa, Sb, Sc, and Sd is turned off so as to block the current. At this time, resonance occurs between parasitic capacitance Cr of a turned-off switching element and resonance coil Lr by resonance coil Lr and parasitic capacitance Cr of switching elements Sa, Sb, Sc, and Sd. Period T0 at one fourth of this resonance period is represented by the following formula (1).

$$T0 = \frac{2\pi\sqrt{Cr \cdot Lr}}{4} \quad (1)$$

When transformer Tr receives a current periodically changing from full-bridge type switching circuit 31, transformer Tr outputs a voltage that changes similarly to a secondary winding. Transformer Tr ensures insulation between the primary winding side and the secondary winding side. Rectifying circuit 32 rectifies the output voltage of transformer Tr to output the voltage to choke coil L31. Choke coil L31 passes a direct current by the voltage of rectifying circuit 32 to output the current to load 60. Output capacitor C31 suppresses fluctuation in the output voltage.

The following describes control unit 40 and data table 50 of Exemplary Embodiment 1 to Exemplary Embodiment 3.

Exemplary Embodiment 1

In Exemplary Embodiment 1, control unit 40 determines optimal dead times Td1 and Td2 with reference to an output current and an output voltage that are supplied to load 60. Dead times Td1 and Td2 will be described in detail later.

Data table 50 of Exemplary Embodiment 1 has a data table in which the output voltage and the output current supplied to load 60, and optimal dead times Td1 and Td2 are associated.

Control unit 40 of Exemplary Embodiment 1 outputs a PFC switching signal to control terminals of switching elements S11 and S12 of PFC circuit 13 to turn on and off switching elements S11 and S12. Accordingly, control unit 40 controls PFC circuit 13 such that a target PFC output voltage (for example, 400 V) is obtained and harmonies flowing out to AC power source Vs is suppressed.

Control unit 40 outputs a DC/DC switching signal to the control terminals of switching elements Sa, Sb, Sc, and Sd to control ON/OFF of switching elements Sa, Sb, Sc, and Sd. As a result, DC/DC converter 30 operates so as to obtain the output voltage and the output, current according to load 60. Subsequently, the control of DC/DC converter 30 will be described in detail with reference to (a) to (h) of FIG. 2.

In FIG. 2, (a) shows ON/OFF of switching element. Sa, (b) shows ON/OFF of switching element Sb, (c) shows ON/OFF of switching element Sc, (d) shows ON/OFF switching element Sd, (e) shows both-end voltage Va of switching element Sa, (f) shows both-end voltage Vb of switching element Sb, (g) shows both-end voltage Vc of switching element Sc, and (h) shows both-end voltage Vd of switching element Sd.

First, control unit 40 performs a phase shift control of DC/DC converter 30 according to load 60. In the phase shift control, control unit 40 controls switching of four switching elements Sa, Sb, Sc, and Sd at a predetermined duty ratio. When, load 60 changes, control unit 40 changes the switching phase between one and the other of a pair of switching elements Sa and Sd. As a result, time period Ton1 during which a current, flows through switching elements Sa and Sd changes. Similarly, control unit 40 changes the switching phase between one and the other of another pair of switching elements Sb and Sc. As a result, time period Ton2 during which a current flows through switching elements Sb and Sc changes. With such control, time periods Ton1 and Ton2 during which a current flows increase or decrease according to the change in load 80, and the output power changes.

Control unit 40 further controls ZVS of DC/DC converter 30. In ZVS control, control unit 40 sets dead time Td1 from turning off one to turning on the other of two switching elements Sa and Sb that are not turned on at the same time. Similarly, control unit 40 sets dead time Td2 from turning on one to turning on the other of another set of two switching elements Sc and Sd that are not turned on at the same time.

Control unit 40 sets dead times Td1 and Td2 based on a detected output voltage signal and a detected output current signal by using data table 50. In data table 50, values of dead times Td1 and Td2 which are optimized for each output voltage and output current are stored, and control unit 40 performs ZVS control using these values.

Dead time Td1 from, the time when switching element Sb is turned off to the time when switching element Sa is turned on will be described. By using the value of optimal dead time Td1, both-end voltage Va of switching element. Sa (source-drain voltage) can be made zero at the end of dead time Td1 (see (e) of FIG. 2). Even if a resonance waveform of dead time Td1 is changed from a standard resonance waveform, since dead Lime Td1 different from a standard dead time value is used, both-end voltage Va of switching element Sa can be set to zero at the end of dead time Td1. This makes switching loss significantly low.

The same is true for dead time Td1 from the time when switching element Sa is turned off to the time when switching element Sb is turned on, and dead time Td2 related to switching elements Sc and Sd.

<Description of Optimal Dead Times Td1 and Td2>

Subsequently, optimal dead times Td1 and Td2 stored in data table 50 will be described in detail.

Figure 4:
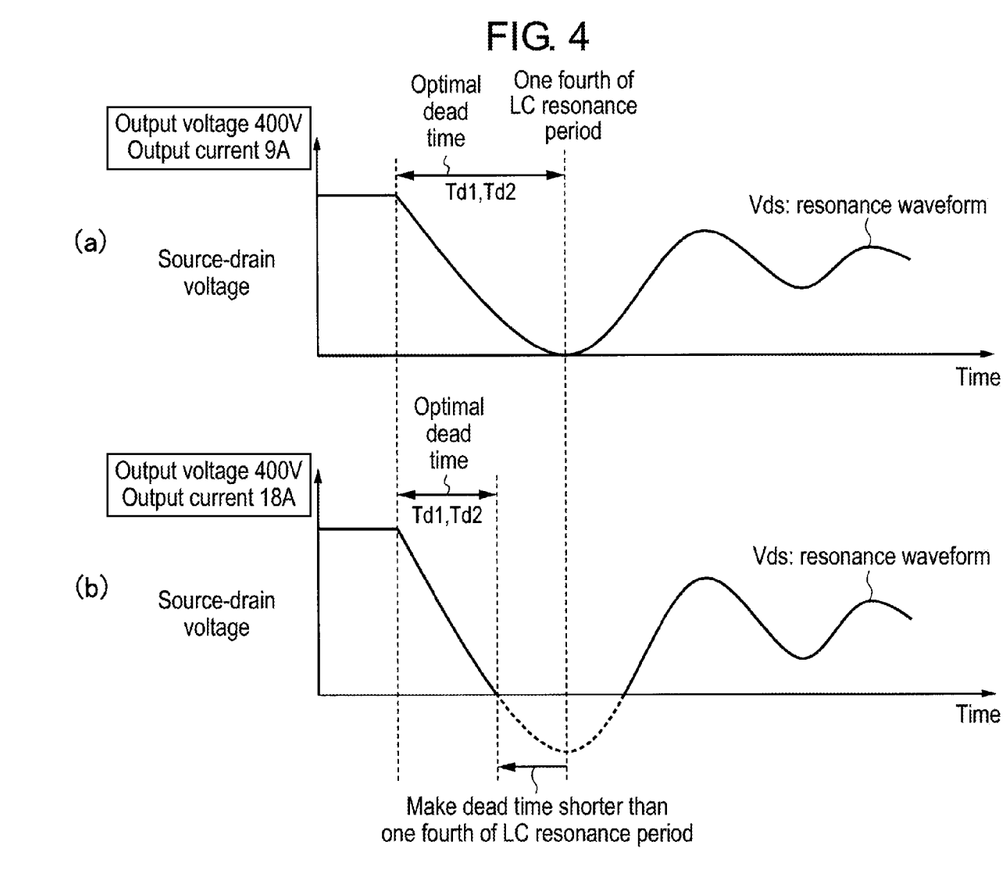
FIG. 4 is a waveform diagram showing a first example and a second example of a resonance waveform that changes according to an input/output.
Figure 5:
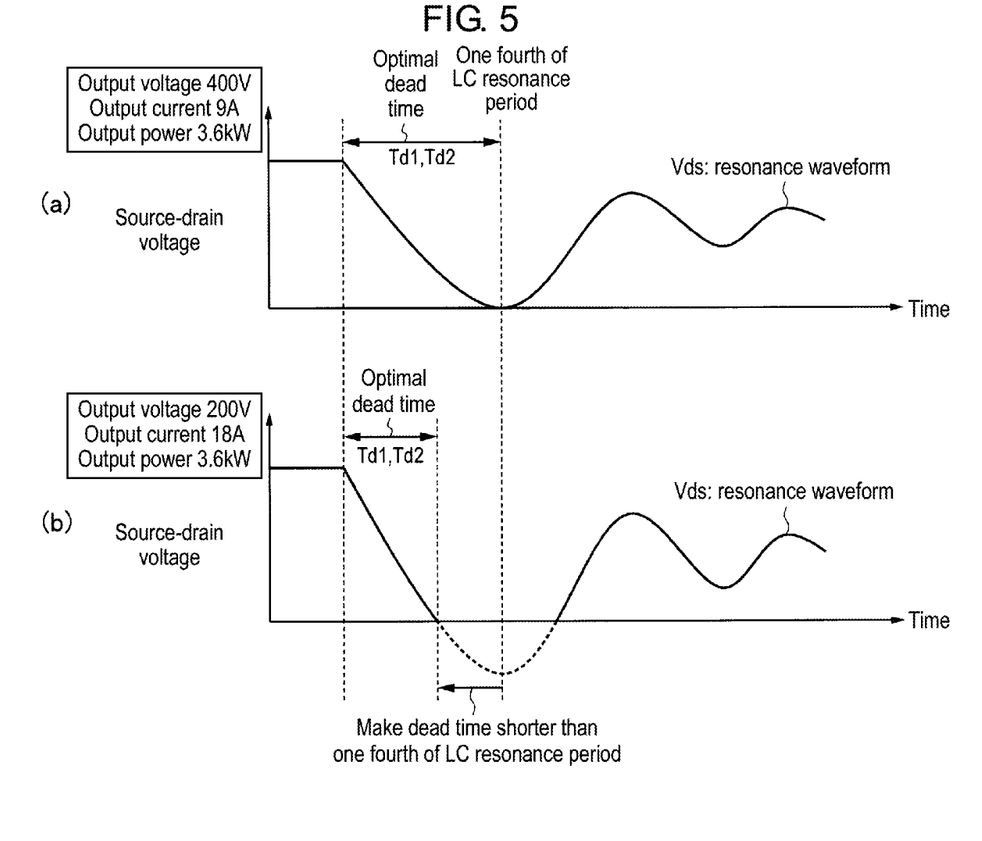
FIG. 5 is a waveform diagram showing a third example and a fourth example of the resonance waveform that changes according to the input/output.

FIG. 4 shows a waveform diagram showing a first example and a second example of a resonance waveform which changes according to an output. (a) of FIG. 4 is a standard waveform diagram, and (b) of FIG. 4 is a waveform diagram changed from the standard waveform. FIG. 5 shows a waveform diagram showing a third example and a fourth example of a resonance waveform which changes according to an output. (a) of FIG. 5 is a standard waveform diagram, and (b) of FIG. 5 is a waveform diagram changed from the standard waveform. Here, the waveforms in FIG. 4 and FIG. 5 show the waveforms when the resonance is continued without switching ON/OFF of switching elements Sa, Sb, Sc, and Sd at the end of dead times Td1 and Td2.

Optimal dead times Td1 and Td2 are determined in advance based on a resonance waveform obtained front a simulation taking into account the details of a circuit or a resonance waveform obtained by actually measuring a circuit under operation. As parameters of the circuit, an output voltage and an output current are selected. By performing simulation or actual measurement according to a plurality of assumed parameters, it is possible to obtain optimal dead times Td1 and Td2 according to a plurality of assumed operation states.

Subsequently, dead time Td1 from the time when switching element Sb is turned off to the time when switching element Sa is turned on will be described. Note that dead time Td1 from the time when switching element Sa is turned off to the time when switching element Sb is turned on, and dead time Td2 related to switching elements Sc and Sd are the same as described below, so detailed description will be omitted.

First Example (a) of FIG. 4 shows a resonance waveform generated between two output nodes n1 and n2 of full-bridge type switching circuit 31 when DC/DC converter 30 has an output voltage of 400 V and an output current of 9 A.

The following will be described assuming that a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes zero.

Thus, optimal dead time Td1 corresponding to these parameters becomes one fourth of the standard LC resonance period, and this value is registered in data table 50.

Second Example (b) of FIG. 4 shows a resonance waveform generated between two output nodes n1 and n2 of full-bridge type switching circuit 31 when DC/DC converter 30 has an output voltage of 400 V and an output current of 18 A. The PFC output voltages of (a) of FIG. 4 and (b) of FIG. 4 are the same.

The following will be described assuming that a resonance waveform different from a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes lower than zero, and the timing at which both-end voltage Va becomes zero is earlier than one fourth of the LC resonance period.

Thus, optimal dead time Td1 corresponding to these parameters becomes a value (Td1 in (b) of FIG. 4) shorter than one fourth of the standard LC resonance period, and this value is registered in data table 50.

Third Example (a) of FIG. 5 shows a resonance waveform generated between two output, nodes n1 and n2 of full-bridge type switching circuit 31 when DC/DC converter 30 has an output voltage of 400 V and an output current of 9 A (output power is 3.6 kW).

The following will be described assuming that a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes zero.

Thus, optimal dead time Td1 corresponding to these parameters becomes one fourth of the standard LC resonance period, and this value is registered in data table 50.

Fourth Example (b) of FIG. 5 shows a resonance waveform generated between two output nodes n1 and n2 of full-bridge type switching circuit 31 when DC/DC converter 30 has an output voltage of 200 V and an output current of 18 A (output power is 3.6 kW). In (b) of FIG. 5, parameters are set such that the output power is the same as (a) of FIG. 5. The PFC output voltages of (a) of FIG. 5 and (b) of FIG. 5 are the same.

The following will be described assuming that, a resonance waveform different from a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes lower than zero, and the timing at which both-end voltage Va becomes zero is earlier than one fourth, of the LC resonance period.

Thus, optimal dead time Td1 corresponding to these parameters becomes a value (Td1 in (b) of FIG. 5) shorter than one fourth of the standard LC resonance period, and this value is registered in data table 50.

The first example to the fourth example above, show an example of a standard resonance waveform and a resonance waveform different from the standard resonance waveform. However, the resonance waveform different from the standard resonance waveform changes variously depending on the parameters of the output voltage and the output current. Therefore, by simulating or actually measuring a circuit by variously changing values of the parameters, optimal dead times Td1 and Td2 corresponding to each value of the parameters are obtained in advance, and these are registered in data table 50. As a result, ZVS control is optimized by optimal dead times Td1 and Td2, and switching loss can be extremely reduced.

Exemplary Embodiment 2

In Exemplary Embodiment 2, control unit 40 refers to PFC output voltage in addition to an output voltage and an output current to determine optimal dead times Td1 and Td2.

Data table 50 of Exemplary Embodiment 2 has a data table in which the PFC output voltage, the output voltage and the output current supplied to load 60, and optimal dead times Td1 and Td2 are associated.

Control unit 40 of Exemplary Embodiment 2 outputs a PFC switching signal to control terminals of switching elements S11 and S12 of PFC circuit 13 to turn on and off switching elements S11 and S12. Accordingly, control unit 40 controls PFC circuit 13 such that a target PFC output voltage (for example, 400 V) is obtained and harmonics flowing out to AC power source Vs is suppressed.

Based on the PFC output voltage, and the detected output voltage signal and the detected output current signal of DC/DC converter 30, control unit 40 determines dead tunes Td1 and Td2 using data table 50. In addition, control unit 40 outputs a DC/DC switching signal to the control terminals of switching elements Sa, Sb, Sc, and Sd to control ON/OFF of switching elements Sa, Sb, Sc, and Sd. As a result, DC/DC converter 30 operates so as to obtain the output voltage and the output current according to load 60.

<Description of Optimal Dead Times Td1 and Td2>

Subsequently, optimal dead times Td1 and Td2 stored in data table 50 will be described in detail.

Figure 6:
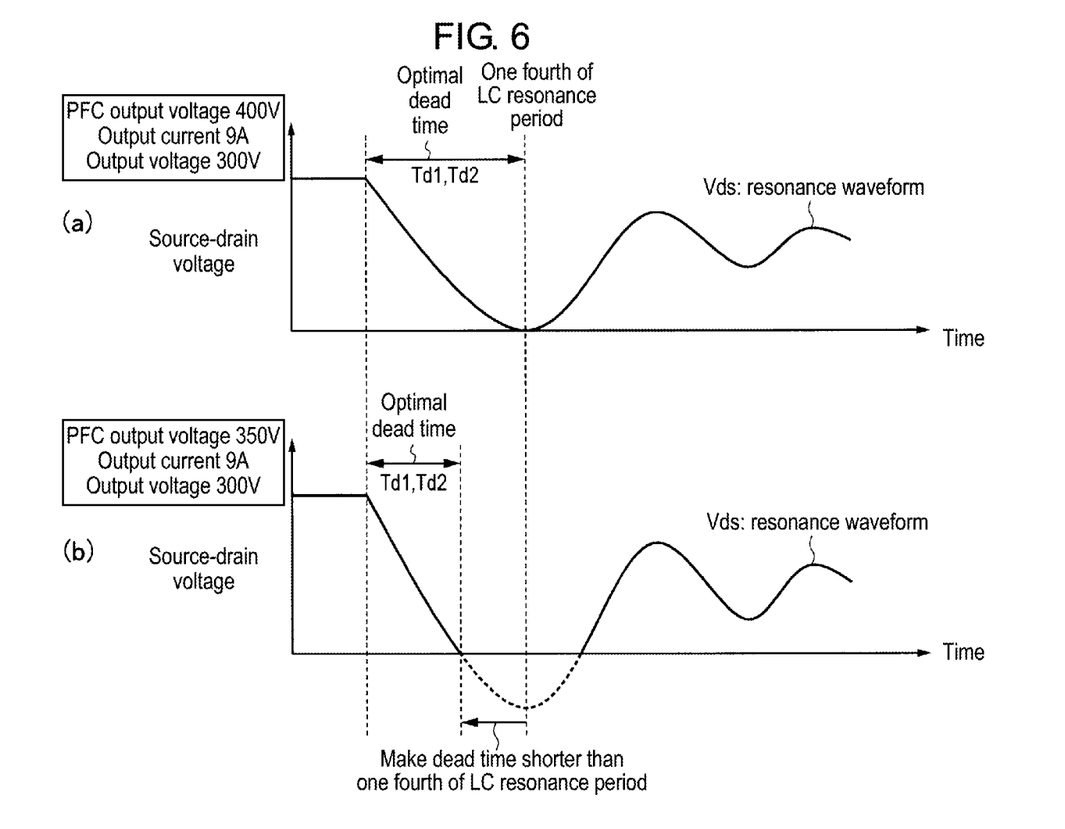
FIG. 6 is a waveform diagram showing a fifth example and a sixth example of the resonance waveform that changes according to the input/output.
Figure 7:
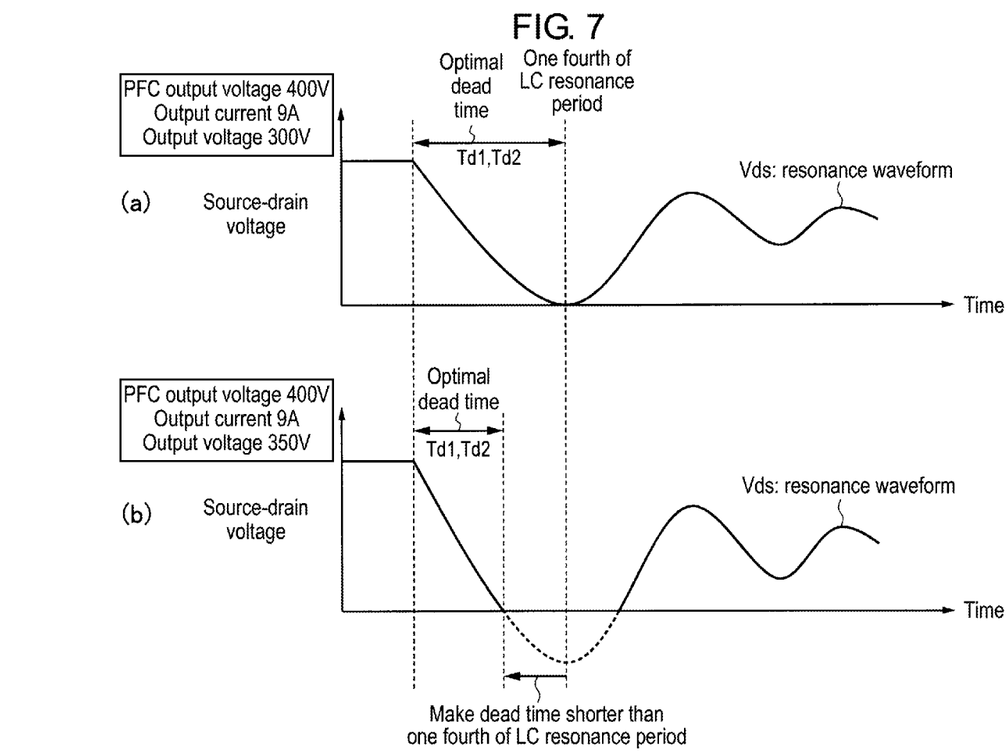
FIG. 7 is a waveform diagram showing a seventh example and an eighth example of the resonance waveform that changes according to the input/output.

FIG. 6 shows a waveform diagram showing a fifth example and a sixth example of a resonance waveform which changes according to an input/output, (a) of FIG. 6 is a standard waveform diagram, and (b) of FIG. 6 is a waveform diagram changed from the standard waveform. FIG. 7 shows a waveform diagram showing a seventh example and an eighth example of a resonance waveform which changes according to an input/output, (a) of FIG. 7 is a standard waveform diagram, and (b) of FIG. 7 is a waveform diagram changed from the standard waveform. Here, the waveforms in FIG. 6 and FIG. 7 show the waveforms when the resonance is continued without switching ON/OFF of switching elements Sa, Sb, Sc, and Sd at the end of dead times Td1 and Td2.

Optimal dead times Td1 and Td2 are determined in advance based on a resonance waveform obtained from a simulation taking into account the details of a circuit or a resonance waveform obtained by actually measuring a circuit under operation. As parameters of the circuit, a PFC output voltage, and an output voltage and an output current, of DC/DC converter 30 are selected. By performing simulation or actual measurement according to a plurality of assumed parameters, it is possible to obtain optimal dead times Td1 and Td2 according to a plurality of assumed operation states.

Subsequently, dead time Td1 from the time when switching element Sb is turned off to the time when switching element Sa is turned on will be described. Note that dead time Td1 from the time when switching element Sa is turned off to the time when switching element. Sb is turned on, and dead time Td2 related to switching elements Sc and Sd are the same as described below, so detailed description will be omitted.

Fifth Example (a) of FIG. 6 shows a resonance waveform generated between two output nodes n1 and n2 of full-bridge type switching circuit 31 when a PFC output voltage is 400 V, and DC/DC converter 30 is an output, voltage of 300 V and an output current of 9 A.

The following will be described assuming that a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next, becomes zero.

Thus, optimal dead time Td1 corresponding to these parameters becomes one fourth of the standard LC resonance period, and this value is registered in data table 50.

Sixth Example (b) of FIG. 6 shows a resonance waveform generated between two output nodes n1 and n2 of full-bridge type switching circuit 81 when a PFC output voltage is 350 V, and DC/DC converter 30 has an output voltage of 300 V and an output current of 9 A.

The following will be described assuming that a resonance waveform different from a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes lower than zero, and the timing at which both-end voltage Va becomes zero is earlier than one fourth of the LC resonance period.

Thus, optimal dead time Td1 corresponding to these parameters becomes a value (Td1 in (b) of FIG. 6) shorter than one fourth of the standard LC resonance period, and this value is registered in data table 50.

Seventh Example (a) of FIG. 7 shows a resonance waveform generated between two output nodes n1 and n2 of full-bridge type switching circuit 31 when a PFC output voltage is 400 V, and DC/DC converter 30 has an output voltage of 300 V and an output current of 9 A.

The following will be described assuming that a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes zero.

Thus, optimal dead time Td1 corresponding to these parameters becomes one fourth of the standard LC resonance period, and this value is registered in data table 50.

Eighth Example (b) of FIG. 7 shows a resonance waveform generated between two output nodes n1 and n2 of full-bridge type switching circuit 31 when a PFC output voltage is 400 V. and DC/DC converter 30 has an output voltage of 350 V and an output current of 9 A.

The following will be described assuming that a resonance waveform different from a standard resonance waveform can be obtained with these parameters. That is, at one fourth of the LC resonance period obtained from the inductance value of resonance coil Lr and the capacitance value of parasitic capacitance Cr of switching element Sa, both-end voltage Va (source-drain voltage Vds) of switching element Sa to be turned on next becomes lower than zero, and the timing at which both-end voltage Va becomes zero is earlier than one fourth of the LC resonance period.

Thus, optimal dead time Td1 corresponding to these parameters becomes a value (Td1 in (b) of FIG. 7) shorter than one fourth of the standard LC resonance period, and this value is registered in data table 50.

In Exemplary Embodiment 2, the PFC output voltage is referred to in addition to the output voltage and the output current of DC/DC converter 30 and optimal dead times Td1 and Td2 are determined. Therefore, it is possible to more accurately assume the load imposed on DC/DC converter 30, and use dead times Td1 and Td2 that can further greatly suppress the switching loss.

Exemplary Embodiment 3

In Exemplary Embodiment 3, control unit 40 further determines a PFC output voltage based on an input of PFC circuit 13 and an output of DC/DC converter 30. Control unit 10 determines optimal dead times Td1 and Td2 based on the PFC output voltage, the output voltage of DC/DC converter 30, and the output current of DC/DC converter 30. A control unit for controlling the PFC output voltage and a control unit for controlling the dead times may be separately provided.

Data table 50 of Exemplary Embodiment 3 has a first data table in which an input voltage and an input current of PFC circuit 13, an output voltage and an output current supplied to load 60, and a target PFC output voltage are associated.

In the present embodiment, a case where the input voltage and the input current of the PFC circuit, the output voltage and the output current of the DC/DC converter, and the target PFC output voltage are associated is exemplified. However, for example, a data table in which the input voltage of the PFC circuit, the output voltage of the DC/DC converter, and the target PFC output voltage are associated may be used. In addition, instead of detecting all of the input voltage and the input current of the PFC circuit, the output voltage and the output current of the DC/DC converter, three of the input voltage and the input current of the PFC circuit, the output voltage and the output current of the DC/DC converter may be detected, and the remaining one may be estimated from the three detected results.

Data table 50 further has a second data table in which the PFC output voltage, the output voltage and the output current supplied to load 60, and optimal dead times Td1 and Td2 are associated.

Control unit 40 of Exemplary Embodiment 3 outputs a PFC switching signal to control terminals of switching elements S11 and S12 of PFC circuit 13 to turn on and off switching elements S11 and S12. Accordingly, control unit 40 controls PFC circuit 13 such that a target PFC output voltage is obtained and harmonics flowing out to AC power source Vs is suppressed.

Control unit 40 determines the target PFC output voltage based on the detected input current signal and the detected input voltage signal of PFC circuit 13, and the detected output current signal and the detected output voltage signal of DC/DC converter 30. At this time, control unit 40 may obtain the target PFC output voltage by using data, table 50.

Control unit 40 outputs a DC/DC switching signal to the control terminals of switching elements Sa, Sb, Sc, and Sd to control ON/OFF of switching elements Sa, Sb, Sc, and Sd. As a result, DC/DC converter 30 operates so as to obtain the output voltage and the output current according to load 60.

Based on the PFC output voltage, and the detected output voltage signal and the detected output current signal of DC/DC converter 30, control unit 40 determines dead times Td1 and Td2 using data table 50.

In this case, in data table 50, values of dead times Td1 and Td2 optimized for the PFC output voltage, and the output voltage and the output current of DC/DC converter 30 may be stored.

Subsequently, a method of determining a target PFC output voltage will be described in detail.

In the switching power supply device having PFC circuit 13 and DC/DC converter 30, in order to improve the power conversion efficiency of the entire switching power supply device, a PFC output voltage is determined based on the input of PFC circuit 13 and the output of DC/DC converter 30. Specifically, control unit 40 determines an optimal "target PFC output voltage" based on the detected input current signal and the detected input voltage signal of PFC circuit 13, the detected output current signal and the detected output voltage signal of DC/DC converter 30, and the first data table in data table 50.

Note that the first data table is basically a table in which the target PFC output voltage increases as the input of PFC circuit 13 and the output of DC/DC converter 30 both increase.

Control unit 40 determines dead times Td1 and Td2 using data table 50 based on the PFC output voltage, and the detected output: voltage signal and the detected output current signal of DC/DC converter 30 while controlling PFC circuit 13 such that the PFC output voltage of the determined target is obtained. The method of determining dead limes Td1 and Td2 is the same as that of Exemplary Embodiment 2, and will be therefore omitted.

In Exemplary Embodiment 3, the PFC output voltage dynamically changes based on the input of PFC circuit 13 and the output of DC/DC converter 30. This makes it, possible to improve the power conversion efficiency of the entire switching power supply device.

Furthermore, in Exemplary Embodiment 3, since dead times Td1 and Td2 are determined based on the PFC output voltage, and the detected output voltage signal and the detected output current signal of DC/DC converter 30, as the PFC output voltage is changed, dead times Td1 and Td2 can also be changed dynamically. As a result, it is possible to improve the power conversion efficiency of the entire switching power supply device and suppress the switching loss, thereby realizing high power conversion efficiency.

As described above, according to the switching power supply device of the exemplary embodiments, even when the resonance waveform obtained by the ZVS control in the phase-shifted full bridge type DC/DC converter is different from the standard resonance waveform, switching loss can be greatly suppressed, and high power conversion efficiency can be realized by using dead times Td1 and Td2 which are set different from the standard values. Furthermore, according to the switching power supply device of the exemplary embodiments, since a saturable choke coil is not used unlike PTL 1, high power conversion efficiency can be realized while suppressing upsizing of the switching power supply device.

Each, exemplary embodiment of the present invention has been described above.

Although AC/DC converter 10 is provided in the front stage of DC/DC converter 30 as a switching power supply device in the above exemplary embodiments, a switching power supply device not having AC/DC converter 10 may be used as well. In this case, in the explanation of an exemplary embodiment, if a PFC output voltage is replaced with an input DC voltage of DC/DC converter 30, the same operation as in those exemplary embodiments can be obtained.

In the above-described exemplary embodiments, a configuration for determining optimal dead times using a data table is shown, but the dead times may be determined using a calculation formula.

In addition, the details specifically described in the exemplary embodiments can be appropriately changed without departing from the gist of the invention.

INDUSTRIAL APPLICABILITY

The present invention can be used in a switching power supply device having a phase-shifted full bridge type DC/PC converter.

The invention claimed is:

1. A switching power supply device which converts an input power input from an AC power source to supply the power to a load, the switching power supply device comprising:
   a power factor improvement circuit;
   a phase-shifted full bridge type DC/DC converter that is arranged in a rear stage of the power factor improvement circuit and has a full-bridge type switching circuit;
   an output current detecting circuit for detecting an output current to be supplied to the load;
   an output voltage detecting circuit for detecting an output voltage to be supplied to the load;
   a power factor improvement circuit output voltage detecting circuit for detecting a power factor improvement circuit output voltage, which is input to the DC/DC converter from the power factor improvement circuit; and
   a control unit for dynamically changing dead times of the full-bridge type switching circuit based on the power factor improvement circuit output voltage, the output current, and the output voltage,
   wherein the control unit applies the dead times that have been changed to control switching of the full-bridge type switching circuit,
   wherein the power factor improvement circuit is an active type power factor improvement circuit having a switching element of which switching is controlled by the control unit,
   wherein the switching power supply device comprises:
   an input current detecting circuit for detecting an input current input from the AC power source; and
   an input voltage detecting circuit for detecting an input voltage input from the AC power source, and
   wherein the control unit controls the switching element of the power factor improvement circuit such that the power factor improvement circuit output voltage becomes a target voltage determined based on the input current, the input voltage, the output current, and the output voltage, and dynamically changes the dead times based on the power factor improvement circuit output voltage, the output current, and the output voltage.

2. The switching power supply device of claim 1, further comprising:
   a data table in which the power factor improvement circuit output voltage, the output current and the output voltage, and the dead times are associated,
   wherein data registered in the data table includes a value of the dead times at which power conversion efficiency is more improved as compared with a case where the dead times are set to one fourth of a period of resonance generated in the full-bridge type switching circuit, and
   wherein the control unit dynamically changes the dead times based on the data table.

3. A switching power supply device which converts an input power input from an AC power source to supply the power to a load, the switching power supply device comprising:
   a power factor improvement circuit;
   a phase-shifted full bridge type DC/DC converter that is arranged in a rear stage of the power factor improvement circuit and has a full-bridge type switching circuit;
   an output current detecting circuit for detecting an output current to be supplied to the load;
   an output voltage detecting circuit for detecting an output voltage to be supplied to the load;
   a power factor improvement circuit output voltage detecting circuit for detecting a power factor improvement circuit output voltage, which is input to the DC/DC converter from the power factor improvement circuit;
   a control unit for dynamically changing dead times of the full-bridge type switching circuit based on the power factor improvement circuit output voltage, the output current, and the output voltage; and
   a data table in which the power factor improvement circuit output voltage, the output current and the output voltage, and the dead times are associated,
   wherein the control unit applies the dead times that have been changed to control switching of the full-bridge type switching circuit,
   wherein data registered in the data table includes a value of the dead times at which power conversion efficiency is more improved as compared with a case where the dead times are set to one fourth of a period of resonance generated in the full-bridge type switching circuit, and
   wherein the control unit dynamically changes the dead times based on the data table.

4. A switching power supply device which converts an input power input from an AC power source to supply the power to a load, the switching power supply device comprising:
   a power factor improvement circuit;
   a phase-shifted full bridge type DC/DC converter that is arranged in a rear stage of the power factor improvement circuit and has a full-bridge type switching circuit;
   an output current detecting circuit for detecting an output current to be supplied to the load;
   an output voltage detecting circuit for detecting an output voltage to be supplied to the load;
   a control unit for dynamically changing dead times of the full-bridge type switching circuit based on the output current and the output voltage; and
   a data table in which the output current and the output voltage, and the dead times are associated,
   wherein the control unit applies the dead times that have been changed to control switching of the full-bridge type switching circuit,
   wherein data registered in the data table includes a value of the dead times at which power conversion efficiency is more improved as compared with a case where the dead times are set to one fourth of a period of resonance generated in the full-bridge type switching circuit, and
   wherein the control unit dynamically changes the dead times based on the data table.

* * * * *